INVENTOR
Hanno Gillmann
BY Spencer & Kaye
ATTORNEY

INVENTOR
Hanno Gillmann

BY Spencer & Kaye

ATTORNEYS

United States Patent Office
3,555,508
Patented Jan. 12, 1971

3,555,508

CHARACTER IDENTIFICATION DEVICE ARRANGED TO IDENTIFY CHARACTERS OF DIFFERENT STYLES

Hanno Gillmann, Constance, Germany, assignor to Telefunken Patentverwertungsgesellschaft m.b.H., Ulm (Danube), Germany Filed July 31, 1968, Ser. No. 748,994
Claims priority, application Germany, Aug. 4, 1967, 1,549,923
Int. Cl. G06k 9/12
U.S. Cl. 340—146.3 5 Claims

ABSTRACT OF THE DISCLOSURE

A device for identifying a character which is detected by a character reader, the character reader providing a plurality of output voltages the amplitude of each of which represents the degree of coincidence between the detected character and a respective nominal character. The device is arranged to identify characters of different types and is provided with several maximum filters each corresponding to one character type and each having a plurality of inputs connected to receive character reader voltages associated with that character type and a plurality of outputs each associated with one character of that type, each filter normally providing a signal at only one of its outputs. The device further includes maximum signal detecting means connected to the filters and having one output for each filter at which appears a signal proportional to the maximum voltage received by that filter, and comparison means for determining which of the maximum signal detecting means outputs contains the highest voltage and for permitting the passage of signals only from that filter associated with the highest maximum signal detecting means voltage.

BACKGROUND OF THE INVENTION

The present invention relates to a character identification device for character readers.

The invention is particularly concerned with devices in which signals from selected elements in a character reading field are compared, for example in a matrix, with predetermined, or nominal, characters and in which there appears on the matrix line associated with each nominal character a voltage corresponding to the degree of coincidence of the character in the reading field with each one of the nominal characters. Such a device may include a maximum filter which determines that line on which the highest voltage appears.

Character readers are known in which a character disposed in the scanning field is scanned with the aid of photodiodes, the photosignals being stored in binary form in the cells of a matrix-type memory. The contents of all the memory cells are simultaneously compared during certain evaluation time periods with a number of special bit patterns each corresponding to the configuration of a respective nominal character.

That nominal character for which this comparison yields the highest coincidence is identifiable in that its corresponding matrix line will contain a voltage signal of higher amplitude than the signals on the lines corresponding to the remaining nominal characters. This highest voltage is fed into a binary threshold value detector which monitors its amplitude value. The threshold value detector emits an output signal whenever its input signal exceeds a preset threshold value.

Such an evaluation device is limited to a certain quite restrictedly defined type of character and the switching thresholds are set, to achieve a certain reading accuracy, so that only those scanned characters which conform to the character store fed into the machine will be positively identified.

Consequently, any given machine can generally be used only to read one narrowly defined type of character.

It has been found in practice that an internationally uniform standard for the configuration of machine-readable characters can be established only with difficulty and that even within individual countries different standards are in effect. As a result, particular care in the selection of the type of characters to be used must be exercised by the purchaser of such a machine and might even necessitate the purchase of more than one machine, one for each type of character to be read. This limitation also makes it necessary, before initiation of the actual reading operation, to sort the material to be read according to the character types which it contains.

SUMMARY OF THE INVENTION

It is a primary object of the present invention to overcome these drawbacks and difficulties.

Another object of the invention is to permit characters of several different types to be automatically identified.

A further object of the invention is to automatically determine the type of each detected character.

Still another object of the invention is to assure that the character identification will be effectuated only when the detected character presents a sufficient degree of coincidence with one nominal character.

These and other objects according to the invention are achieved by a character identifying circuit for use with a character reader which compares a detected character with stored information relating to a group of nominal characters and which applies to each of a plurality of conductors a voltage indicating the degree of coincidence of the detected character with a respective nominal character, the reader containing information relating to several character types and its conductors being divided into several groups each associated with characters of a respective type. The circuit according to the invention essentially includes a plurality of principal maximum filters, a plurality of maximum signal determining means, one for each maximum filter, a further maximum filter connected to the maximum signal determining means, and a plurality of gate means, one for each principal filter. Each principal filter has a plurality of inputs connected to a respective group of conductors and a plurality of outputs each corresponding to a respective one of its inputs, and is constructed to normally provide an output signal only at that one of its outputs which corresponds to that one of its inputs receiving the highest signal voltage, the output at which a signal appears representing that nominal character of the associated type which corresponds most closely with the detected character. Each maximum signal determining means is connected to its respective principal filter for producing an output proportional to the highest one of the voltages appearing on the conductors of the group associated with its respective filter. The further maximum filter has a plurality of inputs each connected to the output of a respective maximum signal determining means and a corresponding plurality of outputs, and is constructed to provide a signal only at that one of its outputs which corresponds to that one of its inputs carrying the highest maximum signal. Finally, each gate means is connected to the outputs of its associated principal filter and to the associated output of the further filter for conducting signals from its principal filter only when a signal appears at its associated further filter output.

In order to substantially eliminate the above disadvantages when using different types of characters, the present invention thus provides an evaluation device which is able to recognize different types of script with respect to their distinguishing characteristics, i.e., the "types of characters," and to identify a character according to the criteria associated with its particular type. The device is able, when differentiating between two character types, to automatically effect the evaluation while providing the appropriate switching threshold for each type and in this manner to achieve the same reading accuracy for each character type.

This is accomplished, according to the present invention, in that matrix lines associated with the nominal characters of one type of script are fed into a maximum filter, the output or input lines of each maximum filter are connected together, for example via a diode OR circuit, to provide an indication of the highest line voltage, and an additional maximum filter is provided for enabling the output gates associated only with that maximum filter having the highest signal voltage value.

DESCRIPTION OF THE PREFERRED EMBODIMENTS

Figure 1A:
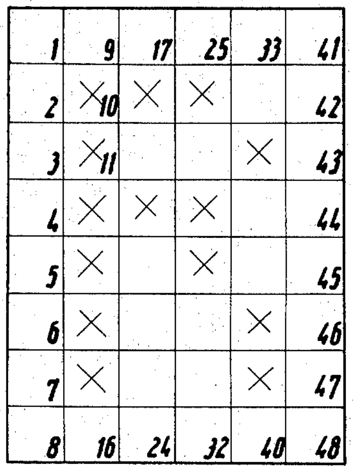
FIG. 1*a* is a pictorial representation of a character reading field.

FIG. 1*a* is a schematic representation of a rectangular scanning field which is subdivided into 6 x 8 picture elements. The photoelectric cells scanning the character are distributed over the scanning field in the pattern of the picture elements. A character, here the letter "R," appearing in the scanning field would thus, for example, make the picture elements marked with crosses appear black and would cause each of the corresponding photoelectric cells to emit a signal.

Figure 1B:
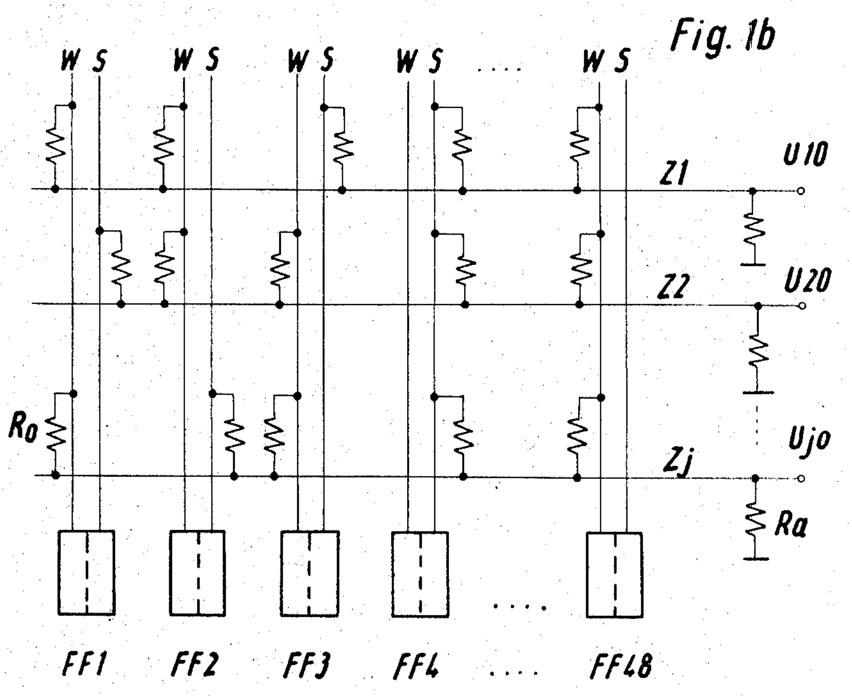
FIG. 1*b* is a circuit diagram of a comparison matrix for comparing a read character with a set of nominal characters.

In the resistor matrix of FIG. 1*b*, a respective one of the bistable flipflops FF1 to FF48 is associated with each photoelectric cell. A line W and a further line S for the negated signal of the line W are connected to each of the flipflops. This total of 48 pairs of lines W, S form the 48 columns of the matrix. The number of rows in the matrix is equal to the number *j* of the characters to be stored in the matrix.

The row lines Z1 to Z*j* leading from the matrix are each connected to ground via a resistor R*a*. The points of intersection of the matrix are indicated by resistors R*o* each of which connects its row line with either the W-line or the S-line of an associated flipflop FF1 to FF48. If a given resistor is connected to the column line W, this means that the corresponding picture element in the scanning field of FIG. 1*a* will be black when the scanned character corresponds to the nominal character represented by the matrix row with which that resistor is associated. Conversely, the connection, via a resistor R*o*, of the row line with a column line S indicates that this particular picture element will not include a portion of a character corresponding to the nominal character of the associated matrix row, i.e., the picture element will be white.

Let it be assumed that a character presently in the scanning field exactly corresponds to a stored nominal character. During evaluation, or sensing, those flipflops FF1 to FF48 corresponding to the picture elements in which portions of the character appear are set to state "1," whereas the other flipflops remain in state "0." It follows from the above assumption, that every intersection point of one specific row line will be connected, via resistors R*o*, to that output W or S of each flipflop which is at a greater potential. Thus, in the one row line corresponding to the recognized character a current flows from each flipflop via a resistor *Ro* and is conducted to ground via the appropriate resistor R*a*. Therefore, a total of 48 partial, equal-amplitude currents are summed in the resistor R*a* so that the voltage drop appearing thereacross is greater than that of the corresponding resistors of the other row lines.

At least some of the other row lines generally also produce partial currents whose amplitudes correspond to the number of their resistors R*o* which are at the highest potential. However, the current sum in each of these other row lines is not high enough to produce a similar signal at its corresponding resistor R*a*.

In practice, however, it can not be assumed that a character to be read will create a pattern which corresponds exactly with the pattern which its associated row line is constructed to match. It can rather only be demanded that the actual character coincide with its preset pattern at a certain minimum number of picture elements.

The above-described mode of character reading is known. The evaluation devices according to the present invention make possible the evaluation of the voltages in the signal lines, and particularly the identification of that line containing the highest voltage signal.

Figure 2:
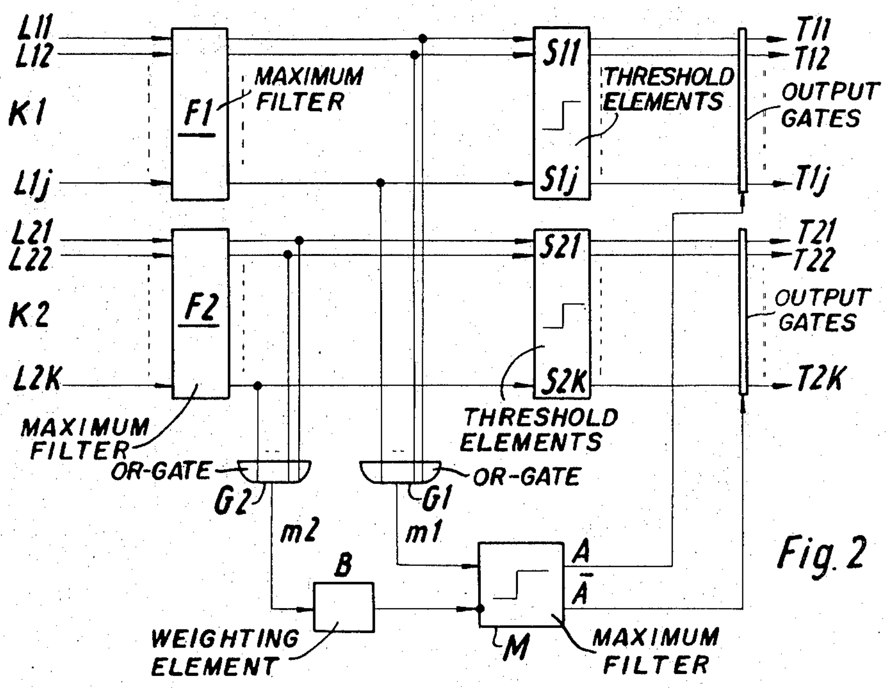
FIG. 2 is a block circuit diagram of one embodiment of the evaluation device according to the present invention.

Referring now to FIG. 2, let it be assumed that the matrix rows of FIG. 1*b* are divided into two bundles K1 and K2 (FIG. 2), of which each is associated with the characters of one type of script. The lines of each bundle are attached to the inputs of a known maximum filter (F1, F2) as disclosed, for example, in U.S. Pat. No. 3,092,732, issued to R. E. Milford on June 4, 1963. Such maximum filters serve to indicate that line among a group of lines carrying simultaneously arriving signals L1 to L*j* which is carrying the highest signal voltage.

Such a circuit can be constructed by connecting each voltage-carrying line to the base of a respective transistor. The emitters of these transistors are connected to a common resistor to produce a bias potential and the increased collector current of the transistor receiving the highest input signal blocks the other transistors, receiving lower input signals, due to the resulting bias which is proportional to the highest transistor output.

It is also possible, according to a further development of the invention described in the above-cited patent, to connect a separate resistor between the emitter electrode of each transistor and the common resistor so that when, for example, the ratio of the highest line voltage to the next-highest line voltage falls below a certain predetermined value, both the transistor receiving the highest input signal and the transistor receiving the second-highest input signal emit output signals. The occurrence of more than one output signal indicates that the scanned character does not coincide with only one particular nominal character and that a rejection signal must be initiated.

In accordance with the present invention, the outputs of such known maximum filters F1 and F2 are combined in two OR elements G1 and G2 which consist, as known per se, of diodes and resistors. The output from each of these elements appears on a respective one of the maximum lines *m*1 and *m*2 and is proportional to the maximum output from its associated maximum filter. The outputs on lines *m*1 and *m*2 are applied to the inputs of a further maximum filter M, line *m*2 being connected via a weighing circuit B which can simply consist, for example, of a voltage divider.

In the case when only two types of characters K1 and K2 are to be distinguished, the maximum filter M can be constituted by a simple threshold value circuit in which the switching threshold is set by the connection of line *m*2 to the threshold signal input and to whose information input the line m1 is connected so that the signal on this line constitutes the signal to be evaluated.

The output A of the threshold value detector controls output gates T11 to T1$j$ provided for each character of script type K1 whereas the negated output signal $\overline{A}$ of the threshold value detector controls the output gates T21–T2$k$ of the character type K2.

The output lines of the maximum filters F1 and F2 are connected to respective threshold value circuits S11 to S1$j$ and S21 to S2$k$, which accomplish the quantization of the filter output voltage values which are until then still present in analog form. The output lines of these threshold value detectors are connected to the above-mentioned output gates controlled by maximum filter M.

In the operation of the circuit of FIG. 2, a character present in the scanning field produces different voltage values in the input lines L11 to L1$j$ and L21 to L2$k$ of the maximum filters F1 and F2. Each maximum filter transfers an output proportional to the highest of the voltage values fed thereinto to its corresponding output line whereas all other output lines normally do not receive a voltage. Via the diode OR-elements G1 and G2 the output voltage from filter F1 is applied directly to the information input of the maximum filter M whereas the output from F2 is applied, via the circuit B, to the threshold input of the maximum filter. Since the signal from line $m2$ is the control in put of the threshold value detector M, its value must be available in negated form. The threshold value detector emits an output signal on line A when the signal of line $m1$ is higher than the correspondingly weighted signal of line $\underline{m2}$. In the opposite case, an output signal is produced at $\overline{A}$.

Thus, the system effects the opening only of those output gates associated with the character type for which the highest signal is applied to the input of the threshold value detector M.

If it is assumed that the character type K1 consists of less stylized characters, the character type K2 being represented by more stylized characters, it is necessary, in order to achieve the same reading accuracy for both types of characters, to adjust the weighting system B to a certain value. Since a character of type K2 normally realizes a more positive coincidence with its associated nominal character than does a character of the type K1, the voltage level of line $m2$ must be correspondingly reduced by system B.

According to a particular embodiment of the evaluation device of the present invention, the maximum filters F1 and F2 are constructed in the manner mentioned above so that they conduct, in addition to a signal corresponding to the highest input signal, also a signal representing the second-highest input signal if the latter exceeds a certain percentage of the former. When employing maximum filters having this characteristic it is necessary to provide an additional doublecheck circuit (not shown) which emits a reject signal whenever a signal appears on more than one output line of a given maximum filter. If this should occur for that character type whose output gates are to be opened in accordance with the decision made by the maximum filter M, the transfer of signals from those output gates must be prevented with the aid of further gates since the character which was read does not coincide with sufficient accuracy with any one nominal character of this type.

Figure 3:
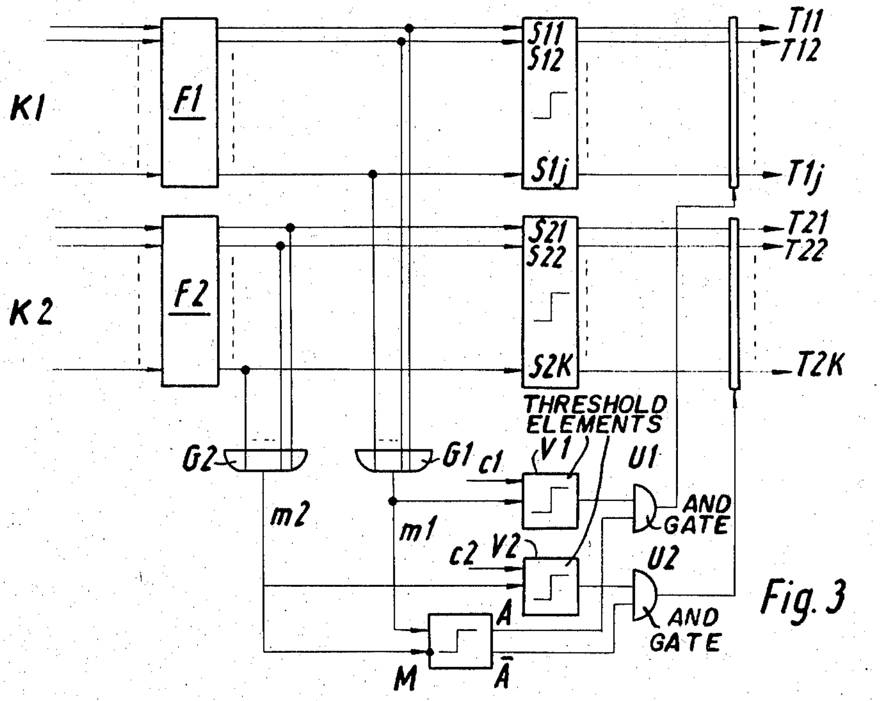
FIG. 3 is a block diagram of another embodiment of the invention.

FIG. 3 shows a circuit which is similar to that shown in FIG. 2, but which differs with regard to the circuitry provided between gates G1 and G2 and gates T. Here the maximum lines $m1$ and $m2$ which carry the output signals from the OR gates G1 and G2 are connected to the information inputs of their own threshold value detectors V1 and V2, as well as to the inputs of the maximum filter M in the manner described in connection with FIG. 2. The threshold value detectors V1 and V2 can be set to predetermined threshold values by threshold control voltages $c1$ and $c2$, respectively. the output from V1 is combined with the output A of the maximum filter M in AND gate U1 and it controls the opening of output gates T11–T1$j$ associated with character type K1, whereas the output line from V2 is connected, together with the signal $\overline{A}$, to a second AND gate U2 for controlling the output gates T21–T2$k$ associated with the character type K2.

In this circuit the threshold values for each character type can be adjusted by the voltages on lines $c1$ and $c2$ independently of each other. The transmission of the output signal of one of the threshold value detectors occurs in dependence on the output signal from maximum filter M. In order to open the output gates associated with one character type, it is thus necessary that the maximum filter F1 or F2 for this character type emit a higher output signal than the filter for the other character type and that this higher output signal exceed the threshold value set at the corresponding threshold value detector V1 or V2.

The present invention is not limited to use with character readers which perform the evaluation with the aid of a correlation matrix as previously described, but can also be used, for example, with readers which identify a character according to the voltage waveform produced by a scanning element. It is furthermore possible to employ the present invention for identifying magnetically readable characters in the same manner as electro-optically readable characters.

It will be understood that the above description of the present invention is susceptible to various modifications, changes and adaptations.

I claim:

1. A character identifying circuit for use with a character reader which compares a detected character with stored information relating to a group of nominal characters and which applies to each of a plurality of conductors a voltage indicating the degree of coincidence of the detected character with a respective nominal character, the reader containing information relating to several character types and its conductors being divided into several groups each associated with characters of a respective type, said circuit comprising, in combination:

(a) a plurality of principal maximum filters, each having a plurality of inputs connected to a respective group of said conductors and a plurality of outputs each corresponding to a respective one of its inputs, each said filter being constructed to normally provide an output signal only at that one of its outputs which corresponds to that one of its inputs receiving the highest signal voltage, the output at which a signal appears representing that nominal character of the associated type which corresponds most closely with the detected character;

(b) a plurality of maximum signal determining means, one for each said maximum filter, each connected to its respective principal filter for producing an output proportional to the highest one of the voltages appearing on the conductors of the group associated with its respective filter;

(c) a further maximum filter having a plurality of inputs each connected to the output of a respective maximum signal determining means and a corresponding plurality of outputs, said further filter being constructed to provide a signal only at that one of its outputs which corresponds with that one of its inputs carrying the highest maximum signal; and (d) a plurality of gate means, one for each said principal filter, each connected to the outputs of its associated principal filter and to the associated output of said further filter for conducting signals from its said principal filter only when a signal appears at its associated further filter output.

2. An arrangement as defined in claim 1 further comprising a plurality of sets of threshold value circuits, the circuits of each set being connected to respective outputs of a corresponding principal maximum filter for converting the signal appearing at any output of said associated maximum filter into a signal having a predetermined amplitude.

3. An arrangement as defined in claim 1 further comprising a plurality of additional threshold elements each having an information input connected to the output of a respective maximum signal determining means and a threshold input for receiving a signal whose value determines the value which the signal at its information input must have in order for said threshold element to produce an output signal, and a plurality of AND elements each having one input connected to the output of a respective additional threshold element and its other input connected to a corresponding output of said further filter, each said AND element having an output connected to a respective one of said gate means for enabling said gate means to conduct signals from its said principal filter only when a signal appears at its associated further filter output and at the output of its associated additional threshold element.

4. An arrangement as defined in claim 3 wherein the threshold input of said said additional threshold element receives an individually controlled threshold signal.

5. An arrangement as defined in claim 1 wherein each said principal maximum filter also produces a signal at each output whose corresponding input signal differs by less than a fixed amount from the highest input signal to said maximum filter, whereby the identification operation is halted when signals appear at more than one output of that maximum filter which is connected to that conductor whose voltage is the highest of the voltages carried by all said conductors.

References Cited

UNITED STATES PATENTS

| | | | |
|---|---|---|---|
| 3,104,369 | 9/1963 | Rabinow et al. | 340—146.3 |
| 3,167,746 | 1/1965 | Reines et al. | 340—146.3 |
| 3,496,542 | 2/1970 | Rabinow | 340—146.3 |

MAYNARD R. WILBUR, Primary Examiner

L. H. BOUDREAU, Assistant Examiner